United States Patent [19]

Farkas et al.

[11] Patent Number: 5,371,166
[45] Date of Patent: Dec. 6, 1994

[54] POLYURETHANE COMPOSITION FOR USE AS A DISPERSING BINDER

[75] Inventors: Julius Farkas, North Ridgeville; Dale R. Hall, Avon Lake; Kyung J. Kim, Westlake; Ravi R. Vedula, North Ridgeville, all of Ohio

[73] Assignee: The B. F. Goodrich Company, Akron, Ohio

[21] Appl. No.: 172,008

[22] Filed: Dec. 22, 1993

[51] Int. Cl.$^5$ ............................................. C08G 18/32
[52] U.S. Cl. ........................................ 528/71; 528/72; 528/85; 523/181
[58] Field of Search ..................... 528/71, 72, 85; 523/181

[56] References Cited

U.S. PATENT DOCUMENTS

| | | | |
|---|---|---|---|
| 3,281,344 | 10/1968 | Thomas | 528/71 |
| 3,401,151 | 9/1968 | Weiden et al. | 528/71 |
| 3,419,420 | 12/1968 | Stahly et al. | 528/71 |
| 3,460,984 | 8/1969 | Bisschops et al. | 528/71 |
| 3,490,045 | 1/1970 | Slovinsky | 528/71 |
| 3,763,079 | 10/1973 | Fryd et al. | 528/71 |
| 3,804,810 | 4/1974 | Fryd | 528/71 |
| 3,955,037 | 5/1976 | Marx et al. | 528/71 |
| 4,000,336 | 12/1976 | Hartmann et al. | 528/71 |
| 4,018,691 | 4/1977 | Neal | 528/71 |
| 4,068,040 | 1/1978 | Yamada et al. | 528/71 |
| 4,073,777 | 2/1978 | O'Neill et al. | 528/71 |
| 4,152,484 | 5/1979 | Bachmann et al. | 528/71 |
| 4,152,485 | 5/1979 | Mizumura et al. | 528/71 |
| 4,284,750 | 8/1981 | Amirsakes | 528/71 |
| 4,286,022 | 8/1981 | Vermillion et al. | 528/71 |
| 4,320,171 | 3/1982 | Motz et al. | 528/71 |
| 4,368,238 | 1/1983 | Somezawa et al. | 528/71 |
| 4,404,253 | 9/1983 | Kohler et al. | 528/71 |
| 4,411,957 | 10/1983 | Tokuda et al. | 528/71 |
| 4,423,115 | 12/1983 | Tokuda et al. | 528/71 |
| 4,501,795 | 2/1985 | Takeuchi et al. | 528/71 |
| 4,503,198 | 3/1985 | Miyai et al. | 528/71 |
| 4,520,079 | 5/1985 | Nakajima et al. | 528/71 |
| 4,521,486 | 6/1985 | Ninomiya et al. | 528/71 |
| 4,525,424 | 6/1985 | Bradshaw | 528/71 |
| 4,529,661 | 7/1985 | Ninomiya et al. | 528/71 |
| 4,567,108 | 1/1986 | Lehner et al. | 528/71 |
| 4,568,611 | 2/1986 | Amirsakis et al. | 528/71 |
| 4,571,364 | 2/1986 | Kasuga et al. | 528/71 |
| 4,607,068 | 8/1986 | Knsel | 528/71 |
| 4,613,545 | 9/1986 | Chubachi et al. | 528/71 |
| 4,615,949 | 10/1986 | Yoda et al. | 528/71 |
| 4,634,633 | 1/1988 | Ninomiya et al. | 528/71 |
| 4,637,959 | 1/1988 | Ninomiya et al. | 528/71 |
| 4,656,089 | 4/1988 | Ninomiya et al. | 528/71 |
| 4,659,626 | 4/1988 | Fukushima et al. | 528/71 |
| 4,666,784 | 5/1988 | Inukai et al. | 528/71 |
| 4,686,145 | 8/1988 | Honda et al. | 528/71 |
| 4,701,372 | 10/1988 | Akiyama et al. | 528/71 |
| 4,707,410 | 11/1988 | Hata et al. | 528/71 |
| 4,734,480 | 3/1988 | Kolera et al. | 528/71 |
| 4,748,084 | 5/1988 | Hata et al. | 528/71 |
| 4,752,530 | 6/1988 | Yamada et al. | 528/71 |
| 4,784,907 | 11/1988 | Matsufuji et al. | 528/71 |
| 4,784,914 | 11/1988 | Matsufuji et al. | 528/71 |
| 4,786,557 | 11/1988 | Kakuishi et al. | 528/71 |
| 4,788,103 | 11/1988 | Okita et al. | 528/71 |
| 4,789,599 | 12/1988 | Nakamura et al. | 528/71 |
| 4,847,156 | 7/1989 | Nishikawa et al. | 528/71 |
| 4,869,965 | 8/1989 | Gerum et al. | 528/71 |
| 4,874,636 | 10/1989 | Okita et al. | 528/71 |
| 4,976,989 | 12/1990 | Aonuma et al. | 528/71 |
| 5,023,135 | 6/1991 | Hasumi et al. | 528/71 |
| 5,030,481 | 7/1991 | Hashimoto et al. | 528/71 |
| 5,034,271 | 7/1991 | Miyoshi et al. | 528/71 |
| 5,045,351 | 9/1991 | Okita et al. | 528/71 |
| 5,069,807 | 12/1991 | Ohkubo | 528/71 |
| 5,071,578 | 12/1991 | Ohkubo et al. | 528/71 |
| 5,073,439 | 12/1991 | Hashimoto et al. | 528/71 |
| 5,084,335 | 1/1992 | Nakano et al. | 528/71 |
| 5,084,341 | 1/1992 | Hashimoto et al. | 528/71 |
| 5,085,941 | 2/1992 | Ohkubo | 528/71 |
| 5,093,172 | 3/1992 | Kato et al. | 528/71 |
| 5,112,680 | 5/1992 | Inaba et al. | 528/71 |
| 5,124,424 | 6/1992 | Endo et al. | 528/71 |
| 5,165,999 | 11/1992 | Ushimaru et al. | 528/71 |

Primary Examiner—Maurice J. Welsh
Attorney, Agent, or Firm—Helen A. Odar

[57] ABSTRACT

The present invention discloses a novel polyurethane composition useful as a dispersing binder. The binder yields magnetic dispersions having high gloss values. Moreover, the polyurethane provides excellent hydrolytic stability. The polyurethane comprises a polyol, a diisocyanate a chain extender and an functional modifier formed of a reaction product of an aminodiol and Bronsted Acid.

19 Claims, No Drawings

POLYURETHANE COMPOSITION FOR USE AS A DISPERSING BINDER

FIELD OF INVENTION

This invention relates to a novel polyurethane composition. This invention also relates to a dispersing binder for magnetic recording media made from this novel polyurethane composition.

BACKGROUND OF THE INVENTION

Polymeric binders in conjunction with dispersing agents have been used to coat magnetic particles on films such as polyester films and disks to form magnetic recording media. High levels of the dispersing agent are usually necessary due to inefficient coupling of the dispersing agent and magnetic pigment. Drawbacks to the use of high levels of dispersing agent in conjunction with the binder include bleeding of the dispersing agent and acceleration of the hydrolytic degradation of the binder, which results in mechanical property degradation.

To overcome many of these drawbacks, various binders which themselves are dispersing agents have come increasingly into use. Several patents disclose a variety of such binders.

U.S. Pat. No. 3,490,945 ("Slovinsky") discloses a polyurethane binder for magnetic recording media which itself is a dispersing agent. The Slovinsky polyurethane binder is a moisture cured diisocyanate terminated prepolymer containing tertiary or quaternary nitrogen.

U.S. Pat. No. 4,286,022 ("Vermillion") is directed to a solution polymerized, hydroxyl terminated polyurethane block copolymer. The Vermillion polyurethane block copolymer comprises polyester or polyether segments, short chain aliphatic segments, 10–100 mole percent which contain tertiary and/or quaternary nitrogen, and symmetrical unbranched aromatic urethane segments interconnecting the polyester or polyether and short-chain aliphatic segments.

U.S. Pat. No. 5,089,344 discloses a magnetic recording medium formed on a base comprising a magnetic powder and a binder. The binder consists of a reaction product of diol, a chain extender such as 1,4-cyclohexanedimethanol, a diisocyanate and a tertiary amine.

U.S. Pat. No. 5,124,424 also discloses a binder for magnetic recording medium. The binder comprises a hydroxy-group terminated polyurethane resin prepared by reaction of a polycarbonate polyol, a chain extender, organic diisocyanate, and an active hydrogen compound having one or more hydrophilic polar groups. The hydrophilic polar amino group may be a tertiary amino group.

A dispersing binder having good dispersing characteristics, solubility, good mechanical properties and hydrolytic stability is desired.

SUMMARY OF THE INVENTION

The present invention provides a novel polyurethane composition comprising:
(a) polyol,
(b) a diisocyanate,
(c) a chain extender, and
(d) a functional modifier.

The present invention also comprises the use of this polyurethane as a dispersing binder. This dispersing binder yields magnetic dispersions having high gloss values indicative of good magnetic properties and dispersibility. It also provides excellent hydrolytic stability. This dispersing binder can be used advantageously to form advanced recording media using high surface area pigments.

DETAILED DESCRIPTION OF THE INVENTION

The polyurethane of the present invention is prepared by reacting a polyol, a diisocyanate, a chain extender and a functional modifier.

Polyol

Suitable polyols include hydroxyl terminated polyethers, hydroxyl terminated polyesters, hydroxyl terminated polycaprolactones, hydroxyl terminated polycarbonate (i.e., a polycarbonate polyol) or mixtures thereof.

A preferred class of hydroxyl terminated polyester intermediates is generally a linear polyester having a weight average molecular weight of from about 600 to about 2,000, and preferably from about 700 to about 1,400, and an acid number generally less than 0.8 and preferably less than 0.5. The molecular weight is determined by end groups analysis. The polyester intermediates are produced by (1) an esterification reaction of one or more glycols with one or more dicarboxylic acids or anhydrides, or (2) by transesterification reaction, i.e., the reaction of one or more glycols with esters of dicarboxylic acids. Mole ratios generally in excess of one mole of glycol to acid are preferred so as to obtain linear chains having a preponderance of terminal hydroxyl groups.

The dicarboxylic acids can be aliphatic, cycloaliphatic, aromatic, or combinations thereof. Suitable dicarboxylic acids which may be used alone or in mixtures usually have a total of from 4 to 15 carbon atoms and include: succinic, glutaric, adipic, pimelic, suberic, azelaic, sebacic, dodecanoic, isophthalic, terephthalic, cyclohexane dicarboxylic, and the like. Anhydrides of the above dicarboxylic acids, such as phthalic anhydride, tetrahydrophthalic anhydride, or the like, and mixture thereof can also be utilized. Adipic acid is the preferred dicarboxylic acid.

The ester-forming glycols can be aliphatic, aromatic, or combinations thereof; have a total of from 2 to 12 carbon atoms. Examples include: ethylene glycol, propylene-1,2-glycol, 1,3-propanediol, butylene-1,3-glycol, 1,4-butanediol, 1,5-pentanediol, 1,6-hexanediol, 2,2-dimethyl-propane-1,3-diol, 1,4-cyclohexanedimethanol, decamethylene glycol, dodecamethylene glycol, hydroquinone bis(2-hydroxyethyl)ether; 2-methyl- 1,3 -propanediol, 3-methyl-1,5-pentanediol and mixtures thereof. 1,4-butanediol is the preferred glycol.

In addition to the above polyester polyols, numerous other types of polyester polyols known to the art and to the literatures can be utilized including those having different molecular weights and/or contain branch polyesters therein. For example polycaprolactone diols can be used. These are known polyester reaction products of lactones and bifunctional compounds having two reactive sites capable of opening the lactone ring. These bifunctional materials may be represented by the formula HX-R-XH wherein R is an organic radical which can be aliphatic, cycloaliphatic, aromatic or heterocyclic and X is O, NH and NR where R is a hydrocarbon radical which can be alkyl, aryl, aralkyl and cycloalkyl. Such materials include diols, diamines and aminoalcohols preferably. Useful diols include alkylene glycols wherein the alkylene group contains 2 to 10 carbon atoms for example, ethylene glycol, 1,2-propane diol, butanediol-1,4, hexamethylene diol-1,6 and the like and mixtures thereof. The preferred ester 1,4 butanediol adipate.

The lactones preferred for preparing the polyesters are epsiloncaprolactones having the general formula

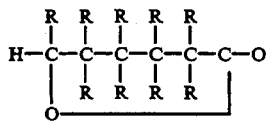

wherein at least 6 of the R's are hydrogen and the remainder are hydrogen or alkyl groups containing 1 to 10 carbon atoms, preferably methyl. Mixtures of lactones may be employed to form the polyesters as epsilon-caprolactone and trimethyl-epsilon-caprolactone, "τ" methyl-epsilon-caprolactone, "β"-methyl-epsilon-caprolactone, dimethyl-epsilon-caprolactone and the like. The lactones are polymerized readily by heating with the bifunctional reactant to a temperature of about 100° to about 200° C. Such polycaprolactone polyols are described in U.S. Pat. No. 3,660,357 which is hereby fully incorporated by reference. Generally, the polycaprolactone diols have a weight average molecular weight in the range of from about 500 to about 5,000.

It is noted that suitable polycarbonate polyols can also be utilized as an intermediate, and the same, as well as methods of preparation thereof, are disclosed in U.S. Pat. No. 4,643,949, which is hereby fully incorporated by reference. Other low molecular weight polycarbonate polyol intermediates can also be made from diols such as those set forth hereinabove, including 1,6-hexanediol, and the like, and phosgene; or by transesterification with low molecular weight carbonates such as diethyl or diphenyl carbonate or mixtures thereof. Generally, the polycarbonate polyols have a weight average molecular weight from about 500 to about 5,000.

The hydroxyl terminated polyethers can be polyether polyols derived from a diol or polyol having a total of from 2 to 15 carbon atoms, preferably an alkyl diol or glycol which is reacted with an ether comprising an alkylene oxide having from 2 to 6 carbon atoms, typically ethylene oxide or propylene oxide, or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol), poly(propylene glycol), poly-(propylene-ethylene glycol), poly (tetramethylene ether glycol) (PTMEG), copolyethers produced from tetrahydrofuran (THF) and ethylene oxide or THF and propylene oxide, glycerol adduct comprising trimethylolpropane reacted with propylene oxide, pentaerythritol adduct comprising pentaerythritol reacted with propylene oxide, and similar hydroxyl functional polyethers or mixtures thereof. Polyether polyols further include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. The various polyether intermediates generally have an average molecular weight, as determined by assay of the terminal functional groups, of from about 250 to about 3,000. The most preferred average molecular weight is in the range of about 600 to about 1,000.

In addition to the above polyether type polyols, other polyols can be utilized known to those skilled in the art as well as to the literature such as those having different molecular weights, made from different reactants, and the like. The determination of the polyol to be used is dependent on the specific needs of the particular application and is well within the purview of one of ordinary skill in the art. The above-mentioned polyols can be used alone or in any combination.

The most preferred polyol is poly(tetramethylene adipate).

Diisocyanate

Any suitable diisocyanate can be used. Suitable diisocyanates include non-hindered aromatic diisocyanates and cyclic aliphatic diisocyanates. Examples of non-hindered aromatic diisocyanate include 4,4'-methylenebis(-phenyl isocyanate) (MDI); phenylene-1,4-diisocyanate, naphthylene-1,5-diisocyanate, diphenylmethane-3,3'-dimethoxy-4,4'-diisocyanate, phenylene-1,3-diisocyanate, meta-tetramethylxylene diisocyanate (m-TMXD1), paratetramethylxylene diisocyanate (p-TMXD1), m-xylylene diisocyanate (XDI) and tolylene diisocyanate (TDI) as well as any combinations thereof. Examples of non-hindered cyclic aliphatic diisocyanates include 1,4-cyclohexyl diisocyanate (CHDI), isophorone diisocyanate (IPDI), decane- 1,10-diisocyanate, dicyclohexylmethane-4,4'-diisocyanate, as well as combinations thereof. The most preferred diisocyanate is 4,4'-methylenebis-(phenyl isocyanate), i.e., MDI.

Functional Modifier

The functional modifier useful in the present invention is a salt which is the reaction product of an aminodiol and a Bronsted acid, such as a phosphonic acid, phosphinic acid, sulfonic acid, or an acid phosphate.

Examples of aminodiols useful in forming the functional modifier include: N-methyldiethanolamine (MDEA), 3-diethylamino- 1,2-propanediol (DEAPD), 2-amino-2-methyl-1,3-propanediol (AMPD), N-(n-butyl)diethanolamine (BDEA), N-(t-butyl)diethanolamine (TBDEA), N-phenyldiethanolamine (PDEA), diethyl N-N-bis(2-hydroxyethyl) amino-methyl phosphonate sold under the tradename FYROL 6 as well as any combinations thereof. Additional aminodiols include: N-ethyldiethanolamine; N-propyldiethanolamine; N-isopropyldiethanolamine; aminopropyldiethanolamine; 3-amino-1,2-propanediol; 3-dimethylamino-1,2-propanediol; 3-dipropylamino-1,2-propanediol; 3-diisopropylamino-1,2-propanediol; 2-amino- 1,3-propanediol; 2-amino-2-ethyl- 1,3-propanediol; N,N'-bis(2-hydroxyethyl)ethylenediamine; 3-pyrrolidino-1,2-propanediol; diethanolamine; diisopropanolamine; 3-piperidino-1,2-propanediol; 4,4'-trimethylene bis(1-piperidine ethanol); 1,4-bis(2-hydroxyethyl)piperazine; 3-morpholino-1,2-propanediol; bis(2-hydroxyethyl)octadecylamine; other ethoxylated fatty amines and propoxylated fatty amines as well as any combinations thereof. The most preferred aminodiol is MDEA.

Useful Bronsted acids include: phosphonic acids, phosphinic acids, sulfonic acids and acid phosphates. Examples of phosphonic acids include but are not limited to: methylphosphonic acid; ethylphosphonic acid; propylphosphonic acid; butylphosphonic acid; t-butylphosphonic acid; methylenediphosphonic acid; 2-chloroethylphosphonic acid; phenyl phosphonic acid; phosphonoacetic acid; and phosphonopropionic acid as well as any combination thereof. Illustrative examples of phosphinic acids include: phenylphosphinic acid; diphenylphosphinic acid; dimethylphosphinic acid; and bis(4-methoxyphenyl) phosphinic acid. Possible sulfonic acids to be used include: methanesulfonic acid; ethanesulfonic acid; propanesulfonic acid; sulfoacetic acid; sulfosuccinic acid; benzenesulfonic acid; 4-ethyl-benzenesulfonic acid; 4-hydroxybenzenesulfonic acid; 4-chlorobenzenesulfonic acid; p-toluenesulfonic acid; 4-sulfophthalic acid; 1-naphthalenesulfonic acid; 2-naphthalenesulfonic acid; 3-sulfobenzoic acid; 4-sulfobenzoic acid; and 5-sulfoisophthalic acid. The acid phosphates are mixtures of acid esters, preferably equimolar mixtures of diesters and monoesters. Examples of acid phosphates include amyl acid phosphate (AAP), 2-ethylhexyl acid phosphate (EttAP), methyl acid phosphate (MAP), ethyl acid phosphate (EAP), and polyoxyethylene nonylphenyl ether phosphate (e.g. Rhodafac ® RE 610), as well as any combinations! thereof. Additional examples of organic acid phosphates include: 2-chloroethyl acid phosphate; n-butyl acid phosphate; butoxyethyl acid phosphate; ethylene glycol acid phosphate; 2-hydroxyethyl methacrylate acid phosphate; isooctyl acid phosphate; octyl acid phosphate; stearyl acid phosphate; n-propyl acid phosphate; n-hexyl acid phosphate; tridecyl acid phosphate; lauryl acid phosphate; cetyl acid phosphate; oleyl acid phosphate; phenyl acid phosphate; octylphenyl acid phosphate; and fluorinated phosphoric acid ester blends such as Zonyl ® UR as well as any combinations thereof. Acid phosphates are the most preferred type of Bronsted acid. Rhodafac ® RE 610 is the most preferred acid phosphate.

The functional modifier is prepared by reacting an aminodiol with a Bronsted acid compound. The synthesis can be carried out neat or in solution. In a neat reaction, the reactants can be charged together into the reaction vessel. An exotherm is observed. In a solution reaction, dropwise addition of reactants is preferred. The functional modifiers obtained in these syntheses vary from crystalline solids to viscous, pourable liquids at room temperature. Alternatively, the functional modifier can be prepared by adding the aminodiol and Bronsted acid compound to the chain extender and/or polyol. The stoichiometry used in the functional modifier synthesis depends on the nature of the Bronsted acid compound. For monobasic acids, an equimolar mount of aminodiol is generally used. For dibasic acids, the amount of aminodiol used may correspond to the first equivalence point or the second equivalence point of the acid. If desired, a slight excess of aminodiol may be used in some systems.

Chain Extender

Exemplary chain extenders include bifunctional to tetrafunctional polyols having a molecular weight of 500 or less and mixtures thereof. Suitable chain extenders include: ethylene glycol, diethylene glycol, 2-methyl-1,3-propanediol, neopentyl glycol, 1,3-butanediol, 3-methyl- 1,5-pentanediol, 1,4-cyclohexanedimethanol, 1,4-butylene glycol, 1,6 hexylene glycol, glycerin, trimethylolpropane, pentaerythritol, 1,4-cyclohexanediol, xylylene glycol, 2-ethyl-1,3-hexanediol, 3-methyl-1,3-butanediol and hydroquinone bis(hydroxyethyl) ether as well as any combinations thereof. The most preferred chain extender is neopentyl glycol.

REACTION

The novel polyurethane composition is prepared by random melt polymerization. In this technique, one or more polyols, one or more chain extenders, and one or more functional modifiers are blended together in the range of about 55° C. to about 90° C. The blend is then heated in the range of about 100° C. to about 160° C. A diisocyanate, or mixture of diisocyanates is heated in the range of about 100° C. to about 140° C., then mixed with the blend vigorously. Inasmuch as the reaction is exothermic, the temperature will increase to about 200°–270° C.

The components are added to obtain a theoretical polymer acid number, based on the amount of functional modifier, in the range of about 0.1 to about 12, desirably from 0.5 to about 8, and preferably from 1 to about 4 mg KOH/g sample. The acid number, which is defined as the milligrams of KOH needed to neutralize 1 gram of sample, can be determined by titrating the sample with base to a colorimetric or potentiometric endpoint. Colorimetric endpoints are usually determined with phenolphthalein indicator.

Generally, the polymer is prepared with one mole of one or more polyols, from about 0.5 to about 5.0 moles of one or more chain extenders, the required amount of one or more functional modifiers to attain the target theoretical polymer acid number, and an amount of one or more diisocyanates such that the ratio of isocyanate2 groups to hydroxyl groups is about 0.95 to about 1.01.

Catalysts may be used to speed up the polyurethane formation and any of those catalysts normally used by those skilled in the art may be employed. Typical catalysts include dibutyltin dilaurate, stannous octanoate, phenyl mereuric propionate, lead octoate, iron acetylacetonate, magnesium acetylacetonate, triethylene diamine, and the like. These may be used, normally in amounts from about 50 to about 200 ppm, based upon the total weight of the reactants.

POLYURETHANE

The weight average molecular weight of the novel polyurethane resin formed in accordance with the present invention is approximately 20,000 to 120,000. The preferred range of the weight average molecular weight is about 40,000 to 90,000. This polyurethane provides magnetic dispersions having high gloss values indicative of good magnetic properties and dispersibility. It also provides excellent hydrolytic stability. Accordingly, this novel polyurethane can be used advantageously as a dispersing binder to form advanced recording media using higher surface area pigments.

MAGNETIC RECORDING MEDIUM

The novel dispersing binder of the present invention can be used in the formation of magnetic recording media according to any conventional process. For example, the novel binder, magnetic particles, and if necessary, one or more various additives are mixed together with an organic solvent to prepare a magnetic coating formulation. The magnetic coating formulation is then placed on a base film or a synthetic disk Exemplary base films include polyester films. After the coating formulation is dried, a surface treatment such as calendar rolling is applied.

As the magnetic particles, $\gamma$-$Fe_2O_3$, mixed crystals of $\gamma$-$Fe_2O_3$ and $Fe_3O_4$, cobalt-doped $\gamma$-$Fe_2O_3$ and $Fe_3O_4$, $CrO_2$, barium ferrite, pure iron, surface-treated iron (e.g., Fe-Co-Co-Ni, Fe-Co-Ni, Fe-Co-B, Fe-Co-Cr-B, Mn-Bi, Mn-Al, Fe-Co-V), iron nitride and other similar magnetic particles are all usable. The preferred magnetic particles are $CrO_2$ or $\gamma Fe_2O_3$.

Any additives can be added to the magnetic coating formulation as needed. A variety of materials conventionally known as additives for magnetic coating formulations can be suitably used, such as lubricants, abrasives, dispersants, antistatic agents and fillers.

Further, exemplary solvents usable for the preparation of the magnetic coating formulation include ketones, e.g., acetone, methyl ethyl ketone, methyl isobutyl ketone and cyclohexanone; alcohols, e.g., methanol, ethanol, propanol, and butanol; esters, e.g., methyl acetate, ethyl acetate and butyl acetate; glycol ethers, e.g., propylene glycol monomethyl ether, ethylene glycol monoethyl ether and dioxane; the acetate esters of glycol ethers, e.g., ethylene glycol monoethyl ether acetate and propylene glycol monomethyl ether acetate; aromatic hydrocarbons, e.g., benzene, cyclohexanone, toluene and xylene; aliphatic hydrocarbons, e.g., hexane and heptane; nitropropane; tetrahydrofuran; dimethylacetamide; and dimethylformamide and mixtures thereof. The most preferred solvent is a mixture of 60% methyl ethylene ketone, 20% cyclohexanone, 20% toluene.

The following non-limiting examples serve to further illustrate the present invention in greater detail.

SYNTHESES OF FUNCTIONAL MODIFIERS

Examples 1 through 36 describe the synthesis of several different functional modifiers.

EXAMPLE 1

A solution of N-methyldiethanolamine (29.79 g) in methanol (115 mL) was added dropwise to phenylphosphonic acid (39.52 g) in methanol (160 mL) over 2 hours. The solvent was removed on a rotary evaporator, leaving a white solid. The solid was recrystallized from isopropanol (mp 92°-95° C.).

EXAMPLE 2

A solution of phenylphosphonic acid (15.81 g) in acetone (100 mL) was cooled to −5° C. A solution of 3-diethylamino-1,2-propanediol (14.72 g) in acetone (60 mL) was added dropwise over 1 hour. A heterogeneous mixture was obtained. After decanting the solvent, the lower viscous liquid layer was dried under vacuum.

EXAMPLE 3

A solution of 2-amino-2-methyl-1,3-propanediol (26.27 g) in methanol (130 mL) was added dropwise to phenylphosphonic acid (39.52 g) in methanol (150 mL) over 2 hours. The solvent was removed on a rotary evaporator leaving a viscous liquid which solidified on cooling. The solid was recrystallized from ethanol (mp 158°-160° C.).

EXAMPLE 4

A solution of phenylphosphonic acid (15.81 g) in acetone (100 mL) was cooled to −15° C. A solution of N-n-butyldiethanolamine (16.12 g) in acetone (100 mL) was added dropwise over 1 hour. A heterogeneous mixture was obtained. The solvent was decanted. After drying the lower viscous liquid layer, it solidified to a waxy solid (mp 55°-61° C.).

EXAMPLE 5

A solution of N-t-butyldiethanolamine (40.31 g) in methanol (120 mL) was added dropwise to phenylphosphonic acid (39.52 g) in methanol (180 mL) over 2 hours. A white solid precipitated from solution near the end of the addition. The solid was isolated and dried (mp 185°-189° C.).

EXAMPLE 6

A solution of phenylphosphonic acid (15.81 g) in acetone (80 mL) was cooled to −5° C. A solution of N-phenyldiethanolamine (18.12 g) in acetone (60 mL) was added dropwise over 1 hour. Solvent was removed on a rotary evaporator, leaving a viscous liquid.

EXAMPLE 7

A mixture of octadecylphosphonic acid (16.72 g) and methanol (150 mL) was heated to 65° C. After achieving dissolution, N-methyldiethanolamine (5.96 g) in methanol (20 mL) was added dropwise. After cooling, a white solid crystallized from solution. The solid was isolated and dried (mp>200° C.).

EXAMPLE 8

A solution of N-methyldiethanolamine (17.88 g) in methanol (50 mL) was added dropwise to phenylphosphinic acid (21.32 g) in methanol (75 mL). Solvent was removed on a rotary evaporator, leaving a viscous liquid.

EXAMPLE 9

A solution of N-methyldiethanolamine (17.88 g) in methanol (50 mL) was added dropwise to p-toluenesulfonic acid (28.53 g) in methanol (75 mL). Solvent was removed on a rotary evaporator, leaving a viscous liquid which solidified on cooling. The solid was recrystallized from hexane/isopropanol (mp 65°-67° C.).

EXAMPLE 10

A solution of 2-amino-2-methyl-1,3-propanediol (10.50 g) in methanol (60 mL) was added dropwise to phosphonopropionic acid (15.39 g) in methanol (100 mL) over 1 hour. Solvent was removed on a rotary evaporator, leaving a viscous liquid.

EXAMPLE 11

A solution of N-methyldiethanolamine (11.94 g) in methanol (60 mL) was added dropwise to phosphonopropionic acid (15.43 g) in methanol (100 mL) over 1 hour. The solvent was removed on a rotary evaporator, leaving a viscous liquid.

EXAMPLE 12

N-methyldiethanolamine (11.08 g) was added slowly with stirring to amyl acid phosphate (20.00 g). The resulting liquid had an acid number of 236.

EXAMPLE 13

N-methyldiethanolamine (9.0 g) was added slowly with stirring to 2-ethylhexyl acid phosphate (20.00 g). The resulting liquid had an acid number of 199.

EXAMPLE 14

3-diethylamino-1,2-propanediol (10.27 g) was added slowly with stirring to amyl acid phosphate (15.00 g). The resulting liquid had an acid number of 226.

EXAMPLE 15

3-diethylamino-1,2-propanediol (8.34 g) was added slowly with stirring to 2-ethylhexyl acid phosphate (15.00 g). The resulting liquid had an acid number of 197.

EXAMPLE 16

N-methyldiethanolamine (12.11 g) was added slowly with stirring to anyl acid phosphate (15.0 g). The resulting liquid had an acid number of 215.

EXAMPLE 17

N-methyldiethanolamine (9.78 g) was added slowly with stirring to 2-ethylhexyl acid phosphate (15.00 g). The resulting liquid had an acid number of 186.

EXAMPLE 18

3-diethylamino-1,2-propanediol (15.02 g) was added slowly with stirring to amyl acid phosphate (15.00 g). The resulting liquid had an acid number of 194.

EXAMPLE 19

3-diethylamino-1,2-propanediol (12.08 g) was added slowly with stirring to 2-ethylhexyl acid phosphate (15.00 g). The resulting liquid had an acid number of 171.

EXAMPLE 20

Diethyl N,N-bis(2-hydroxyethyl)aminomethylphosphonate (27.13 g) was added slowly with stirring to amyl acid phosphate (22.87 g). The resulting liquid had an acid number of 183.

EXAMPLE 21

Diethyl N,N-bis(2-hydroxyethyl)aminomethylphosphonate (31.67 g) was added slowly with stirring to amyl acid phosphate (18.33 g). The resulting liquid had an acid number of 144.

EXAMPLE 22

Diethyl N,N-bis(2-hydroxyethyl)aminomethylphosphonate (11.91 g) was added slowly with stirring to Rhodafac RE-610 (38.09 g). The resulting liquid had an acid number of 92.

EXAMPLE 23

Diethyl N,N-bis(2-hydroxyethyl)aminomethylphosphonate (17.62 g) was added slowly with stirring to Rhodafac RE-610 (32.38 g). The resulting liquid had an acid number of 80.

EXAMPLE 24

N-methyldiethanolamine (27.39 g) was added slowly with stirring to ethyl acid phosphate (32.61 g). The resulting liquid had an acid number of 300.

EXAMPLE 25

N-methyldiethanolamine (32.97 g) was added slowly with stirring to ethyl acid phosphate (27.03 g). The resulting liquid had an acid number of 255.

EXAMPLE 26

N-methyldiethanolamine (28.93 g) was added slowly with stirring to methyl acid phosphate (31.10 g). The resulting liquid had an acid number of 340.

EXAMPLE 27

N-methyldiethanolamine (35.19 g) was added slowly with stirring to methyl acid phosphate (24.85 g). The resulting liquid had an acid number of 272.

EXAMPLE 28

N-methyldiethanolamine (59.5 g) was added slowly with stirring to Findet OJP-5 (214.0 g). The resulting liquid had an acid number of 94.

EXAMPLE 29

N-methyldiethanolamine (119.0 g) was added slowly with stirring to polyoxyethyl lauryl ether phosphate (220.9 g). The resulting liquid had an acid number of 161.

EXAMPLE 30

N-methyldiethanolamine (119.0 g) was added slowly with stirring to Rhodafac RE-610 (442.0 g). The resulting liquid had an acid number of 102.

EXAMPLE 31

A mixture of phenylphosphonic acid (71.3 g) and ethylene glycol (125 g) was heated to 50° C. After complete dissolution of the acid, N-methyldiethanolamine (53.7 g) was slowly added with stirring. The resulting liquid had an acid number 208.

EXAMPLE 32

A mixture of phenylphosphonic acid (64.8 g) and ethylene glycol (125 g) was heated to 50° C. After complete dissolution of the acid, 3-diethylamino-1,2-propanediol (60.3 g) was slowly added with stirring. The resulting liquid had an acid number of 186.

EXAMPLE 33

Methyl iodide (28.39 g) was added dropwise to a solution of N-methyldiethanolamine (23.83 g) in toluene (100 mL). The solution was refluxed for 2 hours. During this time, an insoluble viscous liquid phase had separated. After decanting the solvent, the viscous liquid solidified. The solid was extracted with isopropanol, then with acetone, and then dried (mp 88°–97° C.).

EXAMPLE 34

N-methyldiethanolamine (238.0 g) was added slowly with stirring to Rhodafac RE-610 (442.0). The resulting liquid had an acid number of 82.

EXAMPLE 35

N-methyldiethanolamine (119.0 g) was added slowly with stirring to Findet OJP-5 (214.0 g). The resulting liquid had an acid number of 86.

EXAMPLE 36

N-methyldiethanolamine (178.5 g) was added slowly with stirring to polyoxyethyl lauryl ether phosphate (165.7 g). The resulting liquid had an acid number of 117.

POLYMER SYNTHESES

Polymers were prepared by the random melt polymerization method. In this method, the polyol, chain extender, and functional modifier are blended together at about 60° C. The blend is then heated to 100°–120° C. Diphenylmethanediisocyanate (MDI) is heated separately to 100°–120° C., then mixed with the blend. The reactants are vigorously mixed for about 3 minutes, during which time the temperature typically increases to 200°–250° C. The polymer melt is discharged into a cooled pan, then cured at 60° C. for 1 week after synthesis of the polymer, the Brookfield viscosities of these polymers were determined at 25° C.

EXAMPLE 37

179.5 g of poly(tetramethylene adipate) glycol (PTMAG) with a molecular weight (MW) of 845 (end-group analysis), 20.5 g of 2-methyl-1,3-propanediol (MPD), 3.05 g of functional modifier obtained in Example 1, and 111.7 g of MDI were reacted to give a polymer with theoretical functional group content of 0.035 mmol/g and Brookfield viscosity (BV) (15% total solids in MEK) of 135 cps.

EXAMPLE 38

179.7 g of PTMAG (MW 845), 20.3 g of MPD, 4.39 g of functional modifier obtained in Example 1, and 112.4 g of MDI were reacted to give a polymer with theoretical functional group content of 0.05 mmol/g, BV (15% TS in MEK) of 55 cps, and Mw (GPC) of 36,300.

EXAMPLE 39

135.4 g of PTMAG (MW 836), 14.6 g of MPD, 6.75 g of functional modifier obtained in Example 1, and 86.7 g of MDI were reacted to give a polymer with theoretical functional group content of 0.1 mmol/g and BV (15% TS in MEK) of 40 cps.

EXAMPLE 40

134.9 g of PTMAG (MW 836), 15.1 g of MPD, 3.64 g of functional modifier obtained in Example 2, and 86.2 g of MDI were reacted to give a polymer with theoretical functional group content of 0.05 mmol/g and BV (15% TS in MEK) of 100 cps.

EXAMPLE 41

135.0 g of PTMAG (MW 836), 15.0 g of MPD, 3.13 g of functional modifier obtained in Example 3, and 85.9 g of MDI were reacted to give a polymer with theoretical functional group content of 0.05 mmol/g and BV (15% TS in MEK) of 40 cps.

EXAMPLE 42

134.8 g of PTMAG (MW 836), 15.2 g of MPD, 3.82 g of functional modifier obtained in Example 4, and 86.3 g of MDI were reacted to give a polymer with theoretical functional group content of 0.05 mmol/g and BV (15% TS in MEK) of 80 cps.

EXAMPLE 43

134.8 of PTMAG (MW 836), 15.2 g of MPD, 3.82 g of functional modifier obtained in Example 5, and 86.3 g of MDI were reacted to give a polymer with theoretical functional group content of 0.05 mmol/g and BV (15% TS in MEK) of 180 cps.

EXAMPLE 44

134.8 g of PTMAG (MW 836), 15.2 g of MPD, 4.06 g of functional modifier obtained in Example 6, and 86.4 g of MDI were reacted to give a polymer with theoretical functional group content of 0.05 mmol/g and BV (15% TS in MEK) of 40 cps.

EXAMPLE 45

179.1 g of PTMAG (MW 845), 20.9 g of MPD, 5.04 g of functional modifier obtained in Example 7, and 112.8 g of MDI were reacted to give a polymer with theoretical functional group content of 0.035 mmol/g and BV (15% TS in MEK) of 80 cps.

EXAMPLE 46

179.1 g of PTMAG (MW 845), 20.9 g of MPD, 2.85 g of functional modifier obtained in Example 7, and 111.6 g of MDI were reacted to give a polymer with theoretical functional group content of 0.02 mmol/g and BV (15% TS in MEK) of 150 cps.

EXAMPLE 47

179.3 g of PTMAG (MW 845), 20.7 g of MPD, 1.63 g of functional modifier obtained in Example 8, and 110.9 g of MDI were reacted to give a polymer with theoretical functional group content of 0.02 mmol/g and BV (15% TS in MEK) of 75 cps.

EXAMPLE 48

179.5 g of PTMAG (MW 845), 20.5 g of MPD, 2.87 g of functional modifier obtained in Example 8, and 111.6 g of MDI were reacted to give a polymer with theoretical functional group content of 0.035 mmol/g and BV (15% TS in MEK) of 40 cps.

EXAMPLE 49

179.3 g of PTMAG (MW 845), 20.7 g of MPD, 1.82 g of functional modifier obtained in Example 9, and 111.0 g of MDI were reacted to give a polymer with theoretical functional group content of 0.02 mmol/g and BV (15% TS in MEK) of 345 cps.

EXAMPLE 50

134.7 g of PTMAG (MW 836), 15.3 g of MPD, 1.53 g of functional modifier obtained in Example 10, and 85.0 g of MDI were reacted to give a polymer with theoretical functional group content of 0.05 mmol/g and BV (15% TS in MEK) of 100 cps.

EXAMPLE 51

134.7 g of PTMAG (MW 836), 15.3 g of MPD, 1.53 g of functional modifier obtained in Example 11, and 85.0 g of MDI were reacted to give a polymer with theoretical functional group content of 0.05 mmol/g and BV (15% TS in MEK) of 480 cps.

EXAMPLE 52

162.9 g of PTMAG (MW 819), 37.1 g of neopentyl glycol (NPG), 4.04 g of functional modifier obtained in Example 12, and 137.5 g of 1MDI were reacted to give a polymer with theoretical acid number of 2.8, BV (15% TS in MEK) of 30 cps, and Mw (via GPC) (Mw=weight average molecular weight) of 35,100.

EXAMPLE 53

162.9 g of PTMAG (MW 819), 37.1 g of NPG, 4.80 g of functional modifier obtained in Example 13, and 137.5 g of MDI were reacted to give a polymer with theoretical acid number of 2.8, BV (15% TS in MEK), and Mw (via GPC) of 35,700.

EXAMPLE 54

162.9 g of PTMAG (MW 819), 37.1 g of NPG, 4.21 g of functional modifier obtained in Example 14, and 137.5 g of MDI were reacted to give a polymer with theoretical acid number of 2.8 and BV (15% TS in MEK) of 30 cps.

EXAMPLE 55

162.9 g of PTMAG (MW 819), 37.1 g of NPG, 4,83 g of functional modifier obtained in Example 15, and 137.5 g of MDI were reacted to give a polymer with theoretical acid number of 2.8 and BV (15% TS in MEK) of 27 cps.

EXAMPLE 56

162.9 g of PTMAG (MW 819), 37.1 g of NPG, 4.42 g of functional modifier obtained in Example 16, and 137.5 g of MDI were reacted to give a polymer with theoretical acid number 2.8, BV (15% TS in MEK) of 25 cps, and Mw (via GPC) of 29,500.

EXAMPLE 57

162.9 g of PTMAG (MW 819), 37.1 g of NPG, 5.15 g of functional modifier obtained in Example 17, and 134.7 g of MDI were reacted to give a polymer with theoretical acid number of 2.8, BV (15% TS in MEK) of 22 cps, and Mw (via GPC) of 25,100.

EXAMPLE 58

162.9 g of PTMAG (MW 819), 37.1 g of NPG, 4.90 g of functional modifier obtained in Example 18, and 134.7 g of MDI were reacted to give a polymer with theoretical acid number of 2.8 and BV (15% TS in MEK) of 20 cps.

EXAMPLE 59

162.9 g of PTMAG (MW 819), 37.1 g of NPG, 5.59 of functional modifier obtained in Example 19, and 137.5 g of MDI were reacted to give a polymer with theoretical acid number of 2.8 and BV (15% TS in MEK) of 22 cps.

EXAMPLE 60

146.5 g of PTMAG (MW 823), 33.5 g of NPG, 6.88 g of functional modifier obtained in Example 20, and 127.4 g of MDI were reacted to give a polymer with theoretical acid number of 4 and BV (15% TS in MEK) of 20 cps.

EXAMPLE 61

146.5 g of PTMAG (MW 823), 33.5 g of NPG, 8.84 g of functional modifier obtained in Example 21, and 129.2 g of MDI were reacted to give a polymer with theoretical acid number of 4 and BV (15% TS in MEK) of 15 cps.

EXAMPLE 62

146.5 g of PTMAG (MW 823), 33.5 g of NPG, 13.96 g of functional modifier obtained in Example 22, and 127.0 g of MDI were reacted to give a polymer with theoretical acid number of 4 and BV (15% TS in MEK) of 20 cps.

EXAMPLE 63

146.5 g of PTMAG (MW 823), 33.5 g of NPG, 16.29 g of functional modifier obtained in Example 23, and 129.4 g of MDI were reacted to give a polymer with theoretical acid number of 4 and BV (15% TS in MEK) of 15 cps.

EXAMPLE 64

156.8 g of PTMAG (MW 821), 43.2 g of NPG, 4.72 g of functional modifier obtained in Example 24, and 153.5 g of MDI were reacted to give a polymer with theoretical acid number of 4 and BV (15% TS in MEK) of 25 cps.

EXAMPLE 65

156.8 g of PTMAG(MW 821), 43.2 g of NPG, 5.58 g of functional modifier obtained in Example 25, and 154.2 g of MDI were reacted to give a polymer with theoretical acid number of 4 and BV (15% TS in MEK) of 20 cps.

EXAMPLE 66

156.8 g of PTMAG(MW 821), 43.2 g of NPG, 4.18 g of functional modifier obtained in Example 26, and 153.1 g of MDI were reacted to give a polymer with theoretical acid number of 4 and BV (15% TS in MEK) of 30 cps.

EXAMPLE 67

156.8 g of PTMAG (MW 821), 43.2 g of NPG, 5.22 g of functional modifier obtained in Example 27, and 153.9 g of MDI were reacted to give a polymer with theoretical acid number of 4 and BV (15% TS in MEK) of 20 cps.

EXAMPLE 68

196.3 g of PTMAG (MW 819), 44.7 g of NPG, 9.00 g of functional modifier obtained in Example 28, and 170.0 g of MDI were reacted to give a polymer with theoretical acid number of 1, BV (15% TS in MEK) of 80, and Mw (via GPC) of 50,100.

EXAMPLE 69

199.3 g of PTMAG (MW 819), 45.4 g of NPG, 5.2 g of functional modifier obtained in Example 29, and 170.2 g of MDI were reacted to give a polymer with theoretical acid number of 2, BV (15% TS in MEK) of 34, and Mw (via GPC) of 40,400.

EXAMPLE 70

152.1 g of PTMAG (MW 819), 41.8 g of NPG, 6.06 g of functional modifier obtained in Example 30, and 148.8 g of MDI were reacted to give a polymer with theoretical acid number 1.75, BV (15% TS in MEK) of 74, and Mw (via GPC) of 54,600.

EXAMPLE 71

171.3 g of PTMAG (MW 819), 28.7 g of NPG, 9.82 g of functional modifier obtained in Example 31, and 139.9 g of MDI were reacted to give a polymer with theoretical functional group content of 0.05 mmol/g, BV (15% TS in MEK) of 20, and Mw (via GPC) of 25,100.

EXAMPLE 72

172.0 g of PTMAG (MW 819), 28.0 g of NPG, 10.9 g of functional modifier obtained in Example 32, and 140.6 g of MDI were reacted to give a polymer with theoretical functional group content of 0.05 mmol/g, BV (15% TS in MEK) of 10, and Mw (via GPC) of 24,500.

COMPARATIVE EXAMPLE 73

156.8 g of PTMAG (MW 821), 43.2 g of NPG, 6.74 g of functional modifier obtained in Example 33, and 155.0 g of MDI were reacted to give a polymer with theoretical functional group content of 0.71 mmol/g and BV (15% TS in MEK) of 20. This example illustrates the use of a quaternary amine as compared to Applicants claimed functional modifier.

COMPARATIVE EXAMPLE 74

153.1 g of PTMAG (MW 819), 42.1 g of NPG, 4.84 g of RE610, and 145.4 g of MDI were reacted to give a polymer with theoretical acid number of 1.75 and BV (15% TS in MEK) of 47. This example illustrates the use of an acid phosphate by itself as compared to Applicants claimed functional modifier.

COMPARATIVE EXAMPLE 75

186.6 g of poly(cyclohexanedimethanol adipate azelate) (MW 844), 13.4 g of NPG, 0.85 g of N-methyldiethanolamine, and 85.0 g of MDI were reacted to give a polymer with theoretical tertiary amine content of 0.025 mmol/g and BV (15% TS in MEK) of 120. This example illustrates the use of a tertiary amine as compared to Applicants claimed functional modifier.

COMPARATIVE EXAMPLE 76

139.9 g of poly(cyclohexanedimethanol adipate azelate) (MW 844), 10.0 g of NPG, 0.98 g of N-phenyldiethanolamine, and 63.4 g of MDI were reacted to give a polymer with theoretical tertiary amine content of 0.025 mmol/g. This example illustrates the use of a tertiary amine as compared to Applicants claimed functional modifier.

COMPARATIVE EXAMPLE 77

163.5 g of PTMAG (MW 819), 36.5 g of NPG, 1.72 g of diethyl N,N-bis(2-hydroxyethyl) aminomethyl phosphonate, and 135.9 g of MDI were reacted to give a polymer with theoretical functional group content of 0.02 mmol/g, BV (15% TS in MEK) of 100 cps, and Mw (via GPC) of 98,500. This example illustrates the use of a tertiary amine as compared to Applicants claimed functional modifier.

EXAMPLE 78

188.1 g of PTMAG (MW 819), 51.7 g of NPG, 10.22 g of functional modifier obtained in Example 34, and 187.5 g of MDI were reacted to give a polymer with theoretical acid number of 2, BV (15% TS in MEK) of 44 cps, and Mw (via GPC) of 42, 100.

EXAMPLE 79

195.6 g of PTMAG (MW 819), 44.5 g of NPG, 9.85 g of functional modifier obtained in Example 35, and 168.3 g of 1MDI were reacted to give a polymer with theoretical acid number of 2, BV (15% TS in MEK) of 22 cps, and Mw (via GPC) of 29,800.

EXAMPLE 80

200.7 g of PTMAG (MW 819), 45.7 g of NPG, 3.62 g of functional modifier obtained in Example 36, and 171.9 g of MDI were reacted to give a polymer with theoretical acid number of 1, BV (15% TS in MEK) of 58 cps, and Mw (via GPC) of 50,900.

EXAMPLE 81

200.0 g of PTMAG (MW 819), 45.5 g of NPG, 4.50 g of functional modifier obtained in Example 28, and 168.4 g of MDI were reacted to give a polymer with theoretical acid number of 2, BV (15% TS in MEK) of 60 cps, and Mw (via GPC) of 54,900.

EXAMPLE 82

199.5 g of PTMAG (MW 819), 45.5 g of NPG, 5.00 g of functional modifier obtained in Example 35, and 171.9 g of MDI were reacted to give a polymer with theoretical acid number of 1, BV (15% TS in MEK) of 86 cps, and Mw (via GPC) of 52,400.

EXAMPLE 83

192.0 g of PTMAG (MW 819), 52.7 g of NPG, 5.00 g of functional modifier obtained in Example 34, and 187.5 g of MDI were reacted to give a polymer with theoretical acid number of 1, BV (15% TS in MEK) of 94 cps, and Mw (via GPC) of 60,700.

COMPARATIVE EXAMPLE 84

162.6 g of PTMAG (MW 829), 37.4 g of NPG, and 137.5 g of MDI were reacted to give a polymer with BV (15% TS in MEK) of 510 cps and Mw (via GPC) of 125,400. No functional modifier is used in this example.

COMPARATIVE EXAMPLE 85

156.6 g of PTMAG (MW 829), 43.4 g of NPG, and 148.5 g of MDI were reacted to give a polymer with BV (15% TS in MEK) of 70 cps and Mw (via GPC) of 74,100. No functional modifier is used in this example.

DISPERSION PREPARATIONS AND TESTING

The procedure used to prepare dispersions is shown in Table I. The resulting dispersions were cast on Mylar ® film giving coatings of about four microns thickness. Gloss measurements were taken on a Pacific Scientific gloss meter at 60° reflected light. Magnetic properties were measured on a Motorola LDJ BH meter. Properties of the tape samples are shown in Table II.

POLYMER HYDROLYTIC STABILITY

Hydrolytic stability of the polymers was evaluated by immersing solvent-cast films in water at 70° C. for three weeks. GPC was used to determine the extent of molecular weight reduction. Results are shown in Table III.

TABLE I

| | | Dispersibility testing procedures for audio/video ferrite and chromium dioxide[1,2] | |
|---|---|---|---|
| | | Weight (grams) | Mixing Time |
| I. | Wetting Stage | | |
| | MEK | 14.4 | |
| | Cyclohexanone | 43.6 | |
| | Polymer (15% in MEK)[3] | 40.0 | |
| | | 98.0 | 5 min air |
| | Particles | 100.0 | |
| | | 198.0 | 15 min air |
| II. | Milling State | | |
| | Polymer (15% in MEK)[3] | 20.0 | 30 min air |
| | | 218.0 (50% solids) | 75 min Eiger ® |
| Mill III. | Letdown Stage Letdown solution[4] | | |
| | 25% | 36.4 | 15 min Eiger ® |

TABLE I-continued

Dispersibility testing procedures for audio/video ferrite and chromium dioxide[1,2]

| | Weight (grams) | Mixing Time |
|---|---|---|
| Mill 25% | 36.4 | 15 min Eiger ® |
| Mill 50% | 72.8 | 15 min Eiger ® |
| Mill | 363.6 (33% solids) | final polish 15 min Eiger ® |
| Mill | | |

[1]Solvent system: MEK/cyclohexanone/toluene (60/20/20); Particles: ISK 0070 oxide DuPont V-600
[2]Pigment/binder ratio: 100/20
[3]Polymer solution (15% in MEK): polymer (20.0 g)/MEK (113.3 g)
[4]Letdown solution: polymer solution (73.3 g)/MEK (18.5 g)/cyclohexanone (5.1 g)/toluene (48.7 g)

TABLE II

| | GAMMA IRON OXIDE | | | | CHROMIUM DIOXIDE | | | |
|---|---|---|---|---|---|---|---|---|
| EXAMPLE | GLOSS | SQUARENESS | SFD | COER. | GLOSS | SQUARENESS | SFD | COER. |
| 37 | 84 | 0.78 | 0.42 | 724 | 124 | 0.72 | 0.33 | 723 |
| 38 | 97 | 0.79 | 0.42 | 722 | 137 | 0.81 | 0.33 | 741 |
| 39 | 118 | 0.79 | 0.47 | 716 | — | — | — | — |
| 40 | 95 | 0.80 | 0.44 | 740 | — | — | — | — |
| 41 | 59 | 0.74 | 0.55 | 713 | — | — | — | — |
| 42 | 99 | 0.79 | 0.57 | 736 | — | — | — | — |
| 43 | 92 | 0.76 | 0.51 | 752 | — | — | — | — |
| 44 | 93 | 0.78 | 0.50 | 753 | — | — | — | — |
| 45 | 81 | 0.75 | 0.44 | 712 | — | — | — | — |
| 46 | 33 | 0.74 | 0.50 | 713 | 116 | 0.74 | 0.42 | 733 |
| 47 | 20 | 0.76 | 0.65 | 709 | 108 | 0.77 | 0.38 | 735 |
| 48 | 64 | 0.77 | 0.57 | 725 | — | — | — | — |
| 49 | 11 | 0.75 | 0.61 | 729 | 93 | 0.75 | 0.38 | 743 |
| 50 | 70 | 0.77 | 0.46 | 741 | — | — | — | — |
| 51 | 54 | 0.72 | 0.49 | 723 | — | — | — | — |
| 52 | 100 | — | — | — | — | — | — | — |
| 53 | 104 | — | — | — | — | — | — | — |
| 54 | 82 | — | — | — | — | — | — | — |
| 55 | 90 | — | — | — | — | — | — | — |
| 56 | 106 | — | — | — | — | — | — | — |
| 57 | 107 | — | — | — | — | — | — | — |
| 58 | 85 | — | — | — | — | — | — | — |
| 59 | 82 | — | — | — | — | — | — | — |
| 60 | 99 | — | — | — | — | — | — | — |
| 61 | 103 | — | — | — | — | — | — | — |
| 62 | 103 | — | — | — | — | — | — | — |
| 63 | 104 | — | — | — | — | — | — | — |
| 64 | 102 | 0.81 | 0.36 | 717 | — | — | — | — |
| 65 | 105 | 0.81 | 0.51 | 726 | — | — | — | — |
| 66 | 108 | 0.82 | 0.40 | 727 | — | — | — | — |
| 67 | 109 | 0.83 | 0.52 | 726 | — | — | — | — |
| 68 | 103 | — | — | — | 87 | — | — | — |
| 69 | 103 | — | — | — | — | — | — | — |
| 70 | 90 | — | — | — | 80 | — | — | — |
| 71 | 111 | — | — | — | — | — | — | — |
| 72 | 97 | — | — | — | — | — | — | — |
| Comp. 73 | 6 | 0.75 | 0.57 | 715 | — | — | — | — |
| Comp. 74 | 60 | — | — | — | 47 | — | — | — |
| Comp. 75 | 3 | 0.67 | 0.74 | 687 | 79 | 0.77 | 0.33 | 730 |
| Comp. 76 | 2 | 0.67 | 0.78 | 702 | 25 | 0.71 | 0.39 | 729 |
| Comp. 77 | 3 | — | — | — | — | — | — | — |
| 78 | 107 | — | — | — | — | — | — | — |
| 79 | 107 | — | — | — | 119 | — | — | — |
| 80 | 84 | — | — | — | — | — | — | — |
| 81 | 72 | — | — | — | — | — | — | — |
| 82 | 82 | — | — | — | — | — | — | — |
| 83 | 88 | — | — | — | — | — | — | — |
| Comp. 84 | 2 | — | — | — | — | — | — | — |
| Comp. 85 | 2 | — | — | — | — | — | — | — |

TABLE III

| EXAMPLE | Mw REDUCTION (%) |
|---|---|
| 68 | 26.6 |
| 70 | 15.8 |
| 71 | 27.3 |
| 74 | 85.6 |
| 75 | 39.7 |
| 78 | 29.3 |
| 79 | 27.9 |
| 80 | 24.7 |
| 81 | 22.6 |
| 82 | 26.5 |
| 83 | 9.9 |
| 84 | 27.9 |
| 85 | 11.0 |

As Table II illustrates, the polyurethane formed using the functional modifier as disclosed by this invention has unexpectedly high gloss values indicating great dispersability. In contradistinction, the polyurethanes formed using solely tertiary amines (e.g., Comparative Examples 75, 76, 77), quaternary amines (e.g., Comparative Example 73) and acid phosphate (e.g., Comparative Example 74), or no functional modifier (e.g., Comparative Examples 84 or 85) have very low gloss values.

Table III illustrates the polyurethane of the instant invention provides excellent hydrolytic stability compared to polyurethanes formed using solely tertiary amines (e.g., Comparative Example 75) or an acid phosphate (e.g., Comparative Example 74).

In summary, novel polyurethane compositions and have been described. Although specific embodiments and examples have been disclosed herein, it should be borne in mind that these have been provided by way of explanation and illustration and the present invention is not limited thereby. Certainly modifications which are within the ordinary skill in the art are considered to lie within the scope of this invention as defined by the following claims and all equivalents.

What is claimed is:

1. A polyurethane resin comprising a polyol, diisocyanate, a chain extender and a functional modifier wherein said functional modifier is a reaction product of an aminodiol and Bronsted acid.

2. A polyurethane resin as claimed in claim 1, wherein said Bronsted acid comprises phosphonic acid, phosphinic acid, sulfonic acid or an acid phosphate.

3. A polyurethane resin as claimed in claim 1, wherein said diisocyanate comprises a non-hindered aromatic diisocyanate or a cyclic aliphatic diisocyanate.

4. A polyurethane resin as claimed in claim 1, wherein said polyol is chosen from the group consisting hydroxyl terminated polyethers, hydroxyl terminated polyesters, hydroxyl terminated polycaprolactones, hydroxyl terminated polycarbonates, or mixture thereof.

5. A polyurethane resin having a weight average molecular weight from about 20,000 to about 120,000 comprising a resin of a polyol, a diisocyanate, a chain extender and a functional modifier wherein said functional modifier is a reaction product of an aminodiol and Bronsted acid.

6. A polyurethane resin as claimed in claim 5, wherein said Bronsted acid comprises phosphonic acid, phosphinic acid, sulfonic acid or an acid phosphate.

7. A polyurethane resin as claimed in claim 5, wherein said diisocyanate comprises a non-hindered aromatic diisocyanate or a cyclic aliphatic diisocyanate.

8. A polyurethane resin as claimed in claim 5, wherein said polyol is chosen from the group consisting hydroxyl terminated polyethers, hydroxyl terminated polyesters, hydroxyl terminated polycaprolactones, hydroxyl terminated polycarbonates, or mixture thereof.

9. A magnetic coating formulation comprising:
magnetic particles and a binder, at least a portion of said binder being a polyurethane resin having a weight average molecular weight from about 20,000 to about 120,000 of a polyol, a diisocyanate, a chain extender and a functional modifier wherein said functional modifier is a reaction product of an aminodiol and Bronsted acid.

10. A magnetic coating formulation as claimed in claim 9, wherein said Bronsted acid comprises phosphonic acid, phosphinic acid, sulfonic acid or an acid phosphate.

11. A magnetic coating formulation as claimed in claim 9, wherein said diisocyanate comprises a non-hindered aromatic diisocyanate or a cyclic aliphatic diisocyanate.

12. A magnetic coating formulation as claimed in claim 9, wherein said polyol is chosen from the group consisting hydroxyl terminated polyethers, hydroxyl terminated polyesters, hydroxyl terminated polycaprolactones, hydroxyl terminated polycarbonates, or mixture thereof.

13. A magnetic coating formulation as claimed in claim 9, wherein said magnetic particles comprise $\gamma Fe_2O_3$, $Fe_3O_4$, $CrO_2$, barium ferrite, pure iron, surface treated iron or iron nitride.

14. A magnetic recording medium comprising a magnetic layer comprising a film or disk, magnetic particles and a binder, at least a portion of said binder a polyurethane resin and prepared by random melt polymerization of a polyol, a diisocyanate, a chain extender and a functional modifier wherein said functional modifier is a reaction product of an aminodiol and Bronsted acid.

15. A magnetic recording medium as claimed in claim 14, wherein said polyurethane resin has an weight average molecular weight of about 20,000 to about 120,000.

16. A magnetic recording medium as claimed in claim 14, wherein said Bronsted acid comprises phosphonic acid, phosphinic acid, sulfonic acid or an acid phosphate.

17. A magnetic recording medium as claimed in claim 14, wherein said diisocyanate comprises a non-hindered aromatic diisocyanate or a cyclic aliphatic diisocyanate.

18. A magnetic recording medium as claimed in claim 14, wherein said polyol is chosen from the group consisting hydroxyl terminated polyethers, hydroxyl terminated polyesters, hydroxyl terminated polycaprolactones, hydroxyl terminated polycarbonates, or mixture thereof.

19. A magnetic recording medium as claimed in claim 14, wherein said magnetic particles comprise $\gamma Fe_2O_3$, $Fe_3O_4$, $CrO_2$, barium ferrite, pure iron, surface treated iron or iron nitride.

* * * * *